United States Patent [19]
Schwartz et al.

[11] Patent Number: 5,862,334
[45] Date of Patent: Jan. 19, 1999

[54] MEDIATED ACCESS TO AN INTELLIGENT NETWORK

[75] Inventors: Ronald Schwartz, Nepean; Douglas Gordon Turner, Gloucester; Sylvain Archambault, Hull; Sohale Aziz Mufti; Gordon Lester Rainey, both of Kanata, all of Canada; Marianne Jo Stanke, Elmhurst, Ill.; Wayne Robert Heinmiller, Elgin, Ill.; LaVerne Bentley Shook, Palatine, Ill.; Robert Curtis Schoenstedt, Arlington Heights, Ill.; Marie-Ellen Hull, Algonquin, Ill.

[73] Assignee: Northern Telecom Limited, Ottawa, Canada

[21] Appl. No.: 979,153

[22] Filed: Nov. 26, 1997

Related U.S. Application Data

[63] Continuation of Ser. No. 808,530, Feb. 28, 1997, abandoned, which is a continuation of Ser. No. 272,207, Jul. 8, 1994, abandoned.

[51] Int. Cl.$^6$ ....................................................... G06F 15/56
[52] U.S. Cl. ..................................... 395/200.53; 379/220
[58] Field of Search ........................... 395/200.02, 200.2, 395/200.1; 379/220

[56] References Cited

U.S. PATENT DOCUMENTS

| 4,058,672 | 11/1977 | Crager | 178/3 |
|---|---|---|---|
| 5,134,610 | 7/1992 | Shand et al. | 370/60 |
| 5,430,719 | 7/1995 | Weisser, Jr. | 370/58.2 |
| 5,438,568 | 8/1995 | Weisser, Jr. | 370/60 |
| 5,566,235 | 10/1996 | Hetz | 379/201 |
| 5,581,610 | 12/1996 | Hooshiari | 379/133 |
| 5,664,102 | 9/1997 | Faynberg | 395/200.76 |

*Primary Examiner*—David Y. Eng

[57] ABSTRACT

A network service access system and method for intelligent networks uses a network element called a mediation point between network service switching points (SSP) and third party service provider service control points (SCP). The mediation point acts as a gateway to the AIN network for the service provider SCPs. The mediation point at the boundary of the intelligent network has ports for connection to service providers SCPs and a list of SSPs within the intelligent network to which each respective service provider is allowed access.

20 Claims, 7 Drawing Sheets

MEDIATED ACCESS TO AN INTELLIGENT NETWORK

This application is a continuation of application Ser. No. 08/808,530, filed Feb. 28, 1997, which is a continuation of application Ser. No. 08/272,207, filed Jul. 8, 1994 now abandoned.

This invention relates to intelligent networks and is particularly concerned with providing mediated access to intelligent networks for service providers.

BACKGROUND OF THE INVENTION

The Intelligent Network (IN) architecture has been evolved through the efforts of groups, in particular Bellcore, European Telecommunications Standards Institute (ETSI), International Telecommunications Union (ITU-T), and American National Standards institute (ANSI). These groups have issued respective documentation defining general architecture for IN. This evolution is being driven by the increasing demand for rapid and responsive deployment of services on the telecommunications network.

Increasing competition and changing regulations are providing both a challenge and an opportunity to the telecommunications industry. While some interconnections between network providers have existed for a decade or more, and open Network Architecture (ONA) rules and capabilities have been and continue to evolve, new technologies are increasing the sophistication of these interconnections and hence both their value and their power.

In 1992, the Federal Communications Commission (FCC) mandated the Information Industry Liaison Committee (IILC) to begin work on defining the requirements for network unbundling such that other Service Providers could obtain intelligent access to local subscribers through the LEC network. In addition, in 1993, the FCC issued a Notice of Proposed Rulemaking (NPRM) on Common carriers Docket 91-346, to gather industry views on the requirements for regulations regarding the opening of LEC networks at the SCE, SMS, SCP and SSP levels, To date, service provider access has been technologically difficult to achieve as services have been based on proprietary switches. With intelligent networks (IN), there is an opportunity to provide an open/standard interface whereby service logic in a service control point (SCP) is separated from the switches, (called service switching points (SSPS) in IN).

Initially, the Local Exchange Carriers (LECs) did not intend to use advanced intelligent network (AIN), as defined by Bellcore, to allow competition for services business, but soon recognized this as a new business opportunity. The FCC is aware that there are technology issues that have to be resolved, especially how to protect the integrity/reliability/security of the public switch networks if the intelligent networks are unbundled.

SUMMARY OF THE INVENTION

An object of the present invention is to provide improved access to intelligent networks for service providers.

In accordance with an aspect of the present invention there is provided a method of providing mediated access to an intelligent network for service providers, the method comprising the steps of: providing a mediation point at a boundary of the intelligent network for connection to the service providers; providing, at the mediation point, a predetermined list of network nodes in the intelligent network to which respective service providers are allowed access; screening, at the mediation point, a message between a service provider and a network node connecting a subscriber of the service provider to ensure that the network node is on the predetermined list of network nodes the service provider is allowed to access in the intelligent network; and subsequently, routing messages between the service provider and the network node.

In accordance with another aspect of the present invention there is provided a system for providing mediated access to an intelligent network for service providers, the system comprising: a mediation point at a boundary of the intelligent network having ports for connection to service providers and a predetermined list of network nodes in the intelligent network to which respective service providers are allowed access; and a plurality of network nodes for connecting subscribers, each having trigger criteria, for each service provider having access thereto, for selecting one of the service providers in response to a subscriber.

In accordance with a further aspect of the present invention there is provided a method of providing mediated access to an intelligent network for service providers, the method comprising the steps of: ensuring that network integrity, security, and reliability are protected in giving a service provider access to the intelligent network; allowing the service provider access to the intelligent network; and billing the service provider for gaining access to the intelligent network.

In accordance with yet another aspect of the present invention there is provided a system for providing mediated access for service providers to an intelligent network, the system comprising: a mediation point at a boundary to the intelligent network and having mediation functions for interconnection of service provider service control points to predetermined service switching points within the network; and service switching points within the network having mediation functions for interconnection to selected service provider service control points.

An advantage of the present invention is it provides a clear physical boundary point with non-LEC service providers, standard SS7 signalling, and access to Advanced Intelligent Network (AIN) trigger points. The mediation point becomes the key platform on which specific mediation functions are located, and it can be customized to the requirements of individual network providers.

The service switching point (SSP) is enhanced with functions that are tightly coupled to the AIN Basic Call Model, and all management of trigger-specific data remains at the SSP, as per general AIN philosophy. Thus, overall AIN definition is grown in a consistent fashion and impacts to implement and deploy mediated access are minimized.

BRIEF DESCRIPTION OF THE DRAWINGS

The present invention will be further understood from the following description with reference to the drawings in which.

Similar references are used in different figures to denote similar components.

DETAILED DESCRIPTION

Figure 1:
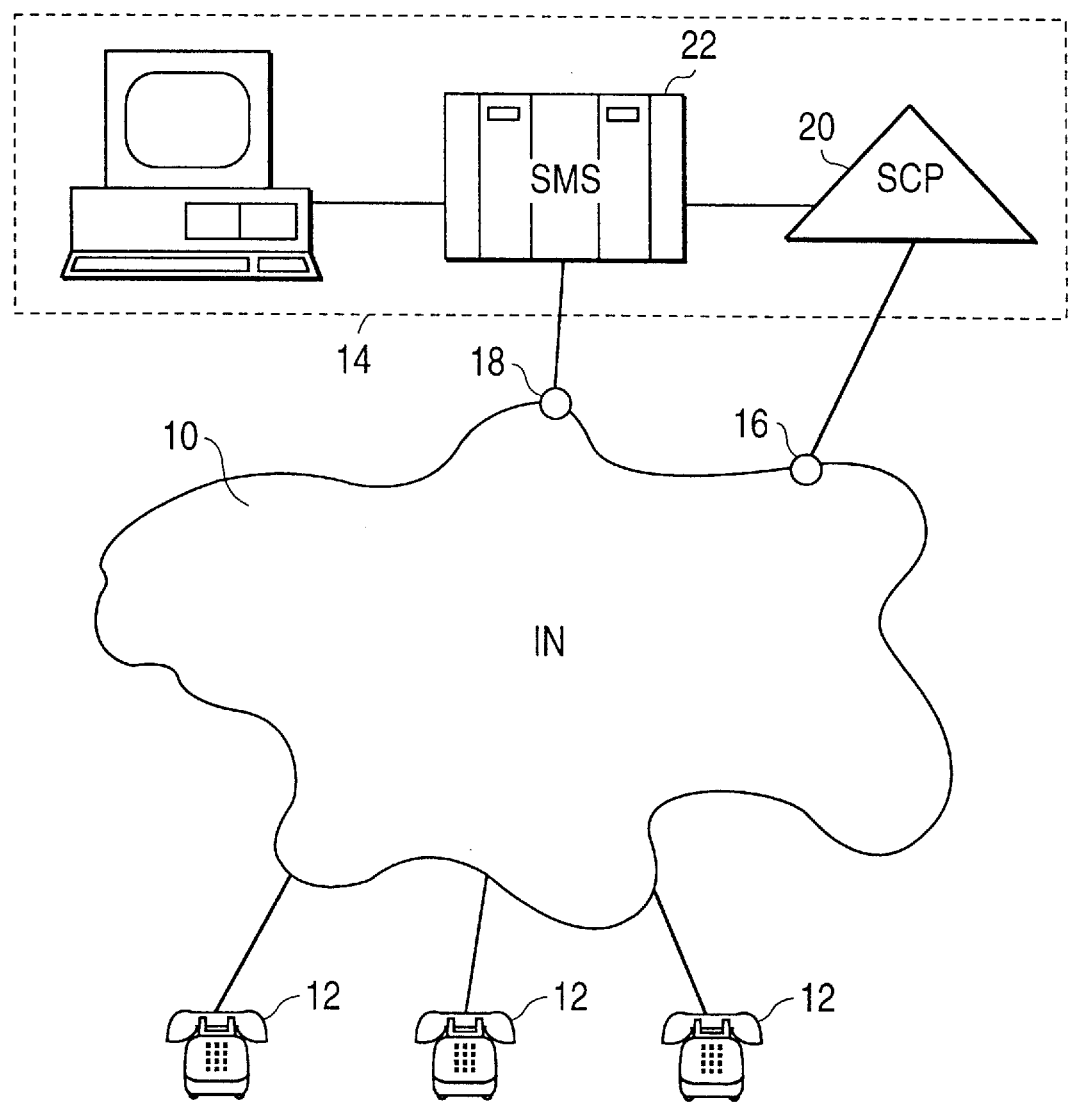
FIG. 1 illustrates an intelligent network (IN) with mediated access points.

Referring to FIG. 1 there is illustrated an intelligent network (IN) with mediated access points.

The intelligent network, represented by cloud 10 provides all of the interconnection service between access subscribers 12. Service providers, as represented by broken line rectangle 14, desiring access to the intelligent network are connected via mediated access 16 and 18. The mediated access 16 connects a service control point (SCP) 20 to the intelligent network 10. The mediated access 18 connects a service management system 22 of service provider 14 to the intelligent network 10. Where to locate such mediated access and how to implement the mediated access functions presents several problems related to balancing costs, deployment time and quality of service. Also the concerns of network operators, service providers and subscribers must be met by the mediated access.

Figure 2:
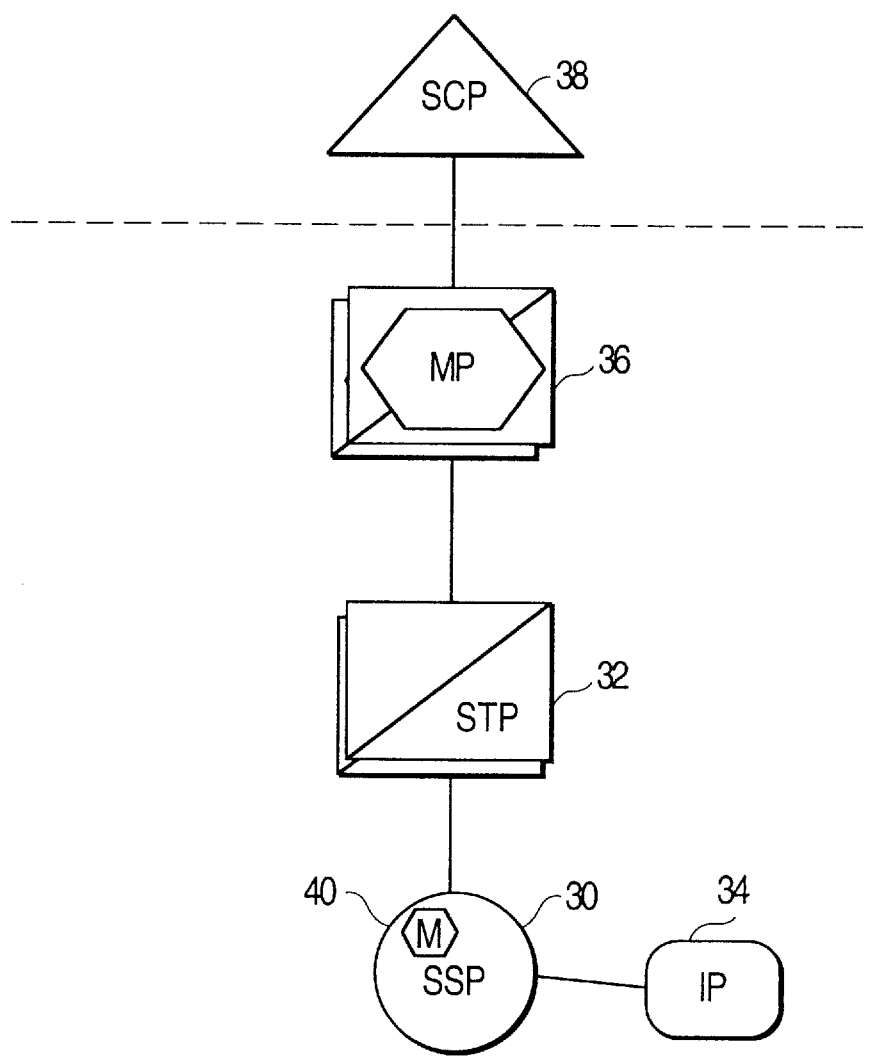
FIG. 2 illustrates in a block diagram an advanced intelligent network (AIN) system with mediated access in accordance with an embodiment of the present invention.

Referring to FIG. 2, there is illustrated in a block diagram an advanced intelligent network (AIN) system with mediated access in accordance with an embodiment of the present invention.

The intelligent network includes service switching points (SSP) 30, each logically connected to signal transfer points (STP) 32 and an intelligent peripheral (IP) 34. The intelligent network is enhanced with the addition of a network element, a mediation point 36 in accordance with an embodiment of the present invention. The mediation point 36 is logically connected to the STP 32. The mediation point 36 is logically connected to service provider SCP 38.

Providing mediated access into the AIN also includes mediation functions at the SSP 30, as represented by a hexagon 40.

In order to provide mediated access to the AIN for service providers, mediation functions must be distributed among the network elements of FIG. 2.

Figure 3:
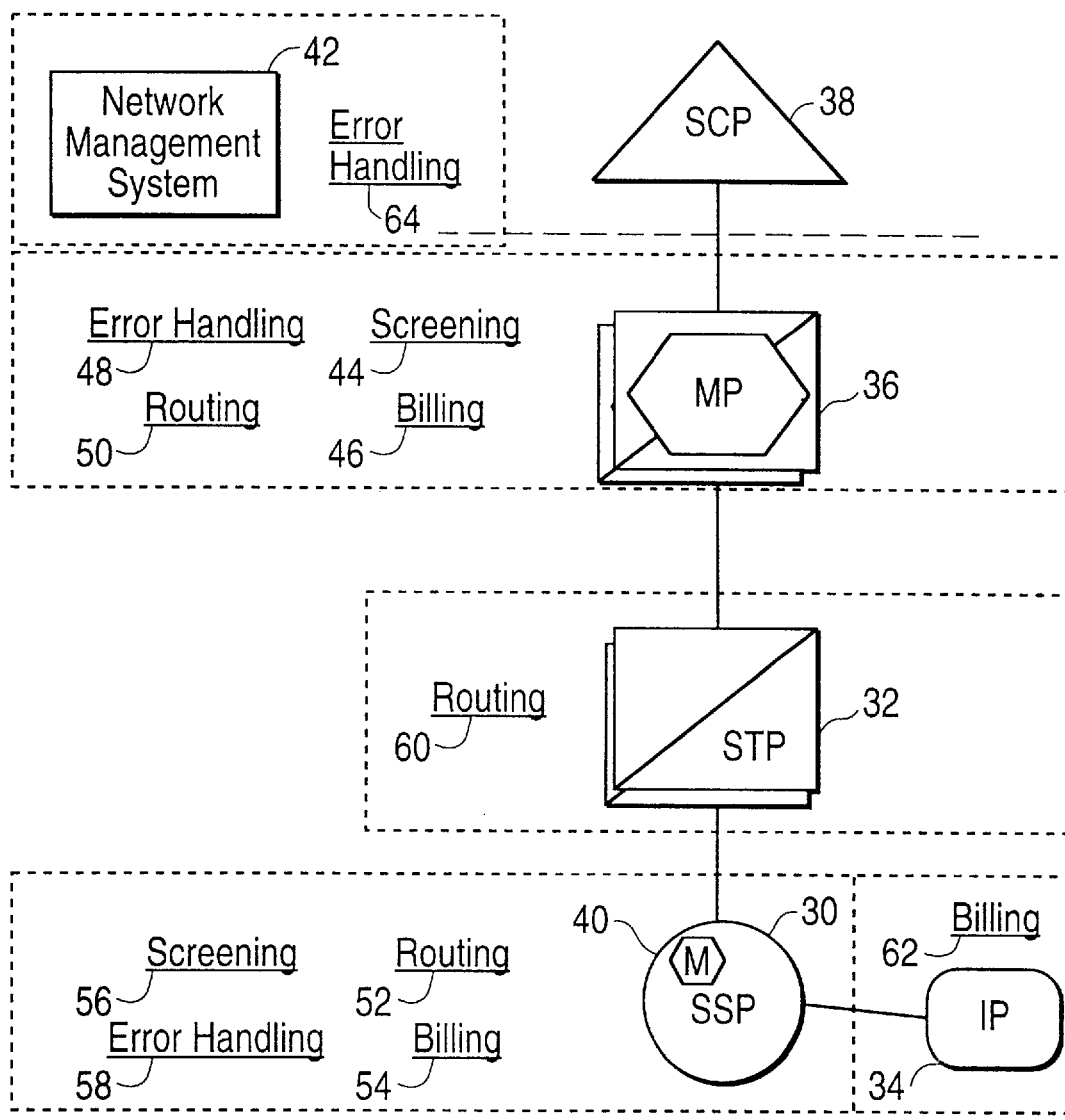
FIG. 3 illustrates in a block diagram distribution of mediation functions in the system of FIG. 2.

Referring to FIG. 3, there is illustrated in a block diagram distribution of mediation functions in the system of FIG. 2.

FIG. 3 shows the same network elements as FIG. 2, and also includes a network management system 42 (not shown in FIG. 2). Connection of the network management system 42 to the system is not shown, but is well known in the art. FIG. 3 shows the distribution of mediation functions among the network elements, the functions grouped within broken line rectangles associated with the network element performing the function.

Most of the mediation functions reside in the mediation point 36. These functions include screening 44, billing 46, error handling 48 and routing 50. Specific examples of each of these types of functions are:

For screening 44,
    MTP (message transfer part) screening
    SSP screening
    Parameter screening (to and from SCP)
    RPCU (radio port control unit) ID screening
    Record received message errors For billing 46,
    Trigger queries
    NCA (Non-Call Associated) messages
    Dynamic trigger arm/disarm For error handling 48,
    Babbling SCP detection/control and For routing 50,
    MP SCCP (signal connection and control part) procedures
    Route messages.

The service switching point (SSP) 30 also includes some mediation functions as indicated by the hexagon 40. These functions include routing 52, billing 54, screening 56 and error handling 58. Specific examples of each of these types of functions are:

For routing 52,
    Service provider selection per trigger
    SSP SCCP procedures
    Route messages to mediator
    Emergency service routing For billing 54,
    ACG (automatic call gapping) usage For screening 56,
    ACG to allowed users
    Trigger arm/disarm and For error handling 58,
    Custom T1 value
    Default on T1 expiry
    ACG default The remaining network elements, the signal transfer point (STP) 32 and the intelligent peripheral (IP) 34 provide routing 60 and billing 62 functions, respectively, used to provide the mediation service. The network management system 42 provides network level error handling 64. Specific examples of these functions are:

For STP routing 60,
    Route messages

For IP billing 62,
    Custom announcements and

For the network management system error handling 64
    Control network overload.

Operation of the system of FIG. 2, is described hereinbelow in conjunction with FIGS. 4, 5 and 6.

Figure 4:
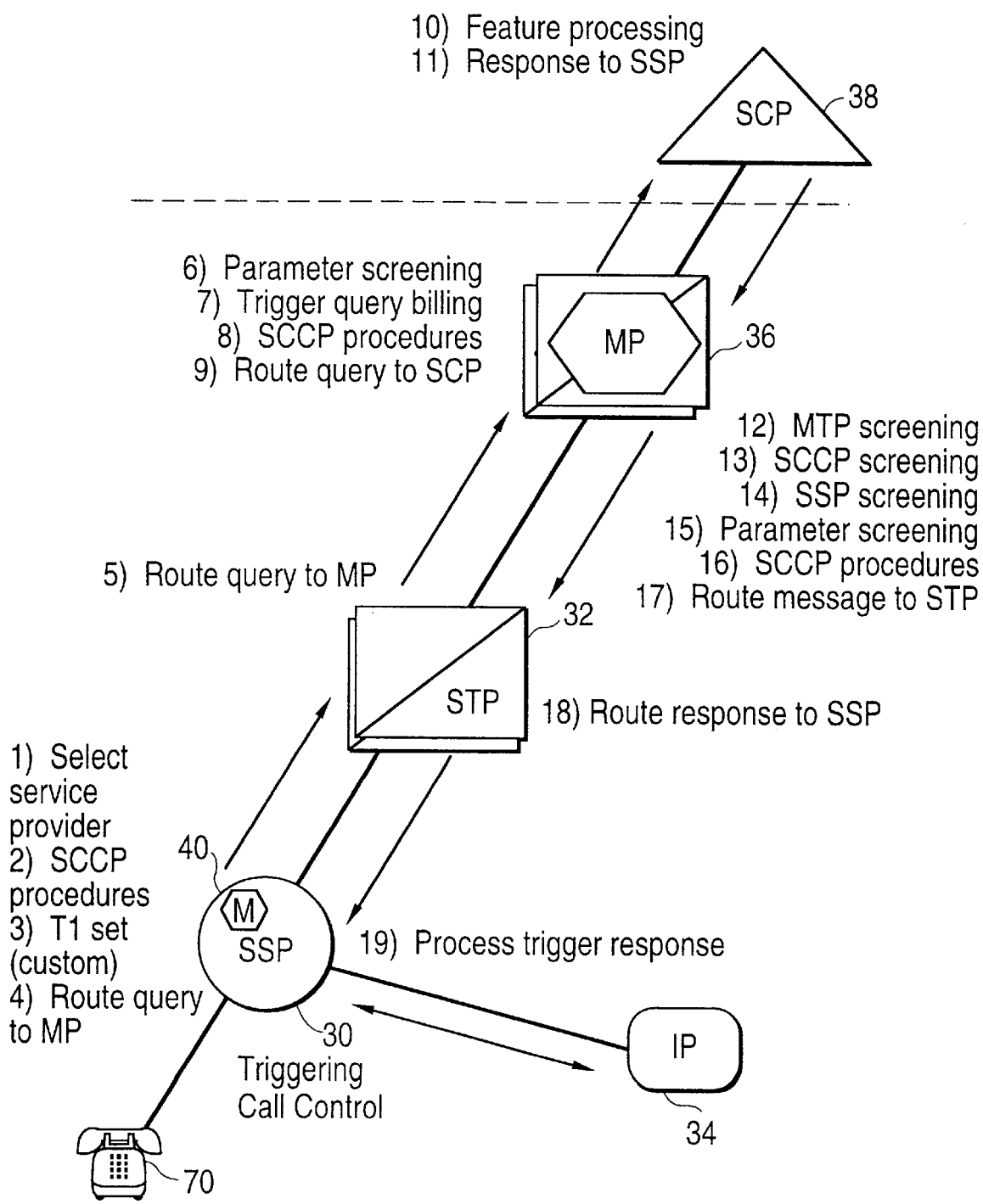
FIG. 4 illustrates in a block diagram message flow for normal trigger processing between mediation functions in the system of FIG. 2.

Referring to FIG. 4, there is illustrated in a block diagram message flow for normal trigger processing between mediation functions in the system of FIG. 2.

Subscriber 70 initiates an AIN trigger activity based on normal AIN trigger event criteria, which can happen on call originations and terminations. Service provider ID is in the trigger data, as subscribed. The mediation function represented by hexagon 40 within the SSP 30 begins the process by a 1) select service provider. Each trigger instance is associated with exactly one service provider. When trigger criteria are met, the service provider's SCP 38 is selected. The process at the SSP 30 next carries out 2) SCCP procedures. The SCCP procedures use global title routing on all SSP messages which are part of a trigger conversation, response to an SCP-initiated transaction, or are unidirectional.

In a received message, the SCCP calling party address, which must include the global title address (GTA) of the SCP 38, is placed in the SCCP called party address field of the outgoing message. For conversation messages in the context of a trigger transaction, the GTA can also be taken from the trigger instance data. For unidirectional messages, the GTA is available from a previously terminated transaction (e.g. for an error message), or identified by the RPCU for non-call associated messages.

The next process step at the SSP 30 is 3) T1 set.

The last process step performed by the SSP 30 is 4) routing query to MP. The GTA of the service provider's SCP (whether duplicated or not) is associated with the trigger instance. When trigger criteria are met, and the trigger is armed, the SCP's GTA is included in the SCCP called address field of the outgoing query. Based on an outstanding ACG request, the query may be rejected, in which case default action may be taken.

The SSP 30 uses as input data GTA of service provider's SCP in each trigger instance and, if applicable, ACG data for targeted users and SSPs for each SCP. The output of the SSP 30 routing step is in GTA in the query's SCCP called address field. The STP 32, passes the query from the SSP 30 to the MP 36 in 5) routes query to MP.

The mediation point (MP) 36 begins its mediation process with 6) parameter screening. Based on the service provider profile and general privacy requirements, certain parameters are not included in outgoing AIN query messages, regardless of the availability of the information.

Disallowed parameters are removed from the AIN Message sent by the SSP 30. For subscribed parameters where the data is private (i.e. restricted numbers), only the private data is removed; the rest of the parameter is left intact. The MP 36 uses a list of allowed parameters, and values, per SCP for outgoing messages, to screen the message from SSP 30 to provide a filtered AIN message. Call processing data may be used by the MP 36 to assist this screening.

The next step for MP 36 is to initiate 7) trigger query billing. Every time a trigger's criteria are met, and a query is originated, a record may be made for usage-sensitive billing purposes.

The MP 36 performs an SCCP procedure 8). The SCCP procedure represents a change introduced by mediation into the normal SS7/AIN model. The SSP 30 must be able to address both the MP 36 and SCP 38, while the SCP 38 must address both the MP 36 and SSP 30. The additional need to address the MP 36 on all messages, in both directions, is the reason for these new procedures.

After performing 8) SCCP procedures, the MP 36, 9) routes query to SCP 38. The MP 36 includes global title address (GTA) of the SSP 30 for messages sent on to the SCP 38.

In a received message, the GTA in the SCCP calling party address field is placed in the outgoing message.

Using SCCP information in received messages from the SSP 30 or SCP 38, the MP 36 provides SCCP information in outgoing messages, and makes a peg count of messages missing SCCP global title address.

The service provider's SCP 38 performs whatever processing is appropriate with step 10) feature processing and generates with step 11) a response to the SSP 30.

On receiving a response from the SCP 38, MP 36 performs several screening steps. In step 12) message transfer part (MTP) screening, the MP 36 screens messages from service providers to ensure: the origination point code (OPC) is that of the connected SCP; the destination point code (DPC) can only be that of the MP. The impact is that messages must be processed by the mediation application at the MP, and the SCP can not misrepresent itself.

The OPC must be allowed over the SS7 link-set, that is, it must identify the SCP 38. The DPC screening is provided by known STP Gateway screening.

In step 13) SSCP screening, the MP 36 performs SCCP called party address screening that ensures the SCP addresses only authorized SS7 nodes, including SSPs.

Each message from an SCP (query, conversation, response, unidirectional) is screened. The global title address in the SCCP called party address field is screened against a list authorized SS7 nodes. SCP messages must include the GTA of both the SCP 38 and SSP 30. These procedures ensure proper SCCP addressing on subsequent messages. Messages from the SCP must include the GTA of the SCP in the SCCP calling party address and the GTA of the SSP in the SCCP called party address. If a message received at the MP 36 does not include this global title information, it is ignored, and the occurrence is pegged. The message is ignored if screening fails.

The MP 36 may perform other screening, for example, TCAP (transaction capabilities application part) and AIN message screening. After normal TCAP and AIN Message screening (both response and unsolicited messages), if an error is found the screening failure is pegged and the message is logged. The erroneous message is then discarded.

As shown in step 15), the MP 36 performs parameter screening. Each parameter in the response message is checked against the list of allowed parameters. If a parameter is allowed, the contents are checked against the list of allowed values, if applicable. If screening fails, the message from the SCP 38 is discarded, but the screening failure is pegged.

Step 16) SCCP procedures and 17) route response to STP are similar to steps 8) and 9) described hereinabove.

The STP 32 in step 18) routes the response from the SCP 38 to the SSP 30. To complete the exchange, SSP 30 in step 19) processes the trigger response in a manner as is known in AIN.

Figure 5:
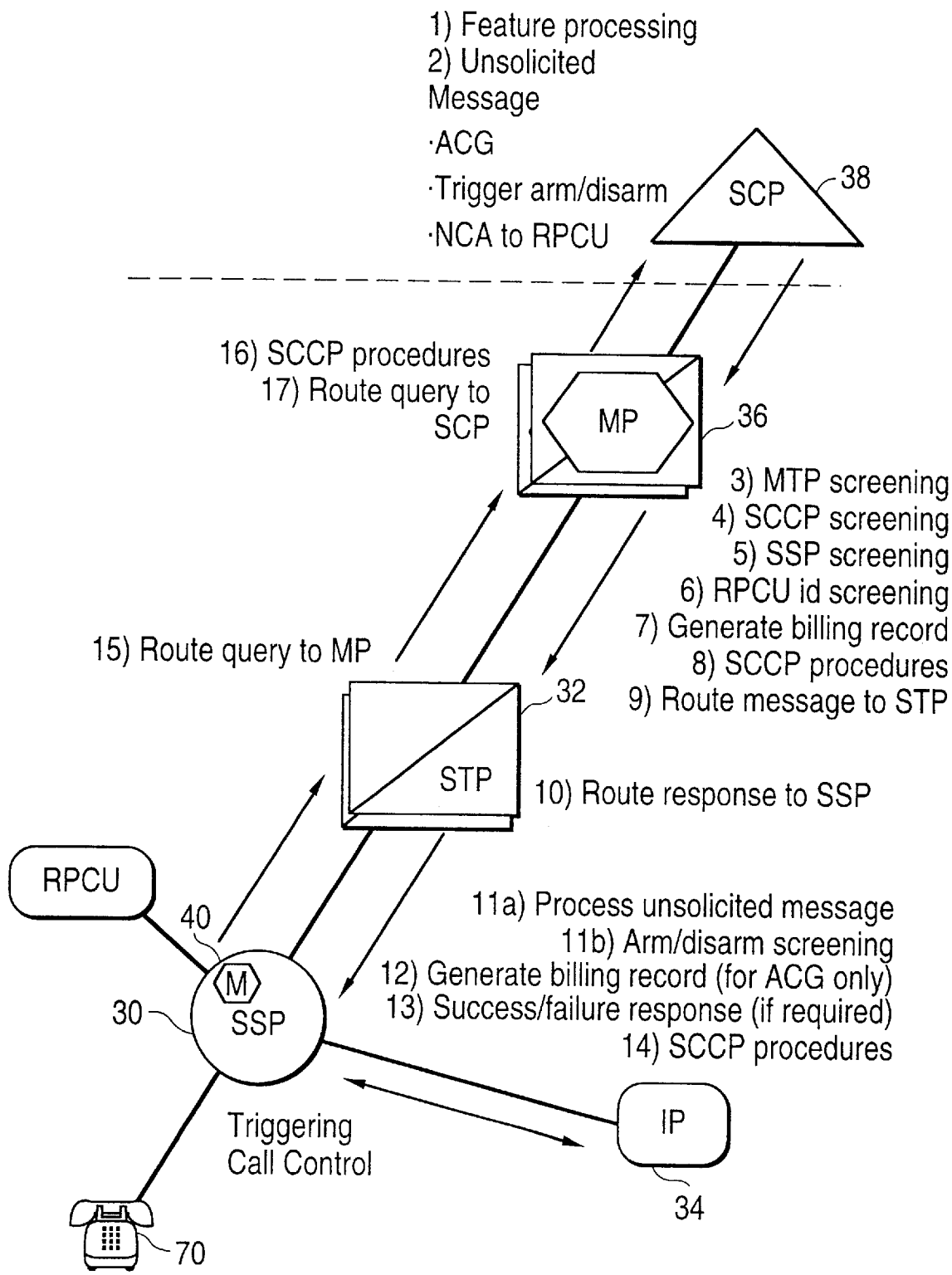
FIG. 5 illustrates in a block diagram message flow for unsolicited messages between mediation functions in the system of FIG. 2.

Referring to FIG. 5, there is illustrated in a block diagram, a message flow for unsolicited messages between mediation functions in the system of FIG. 2.

In the system of FIG. 2, the SCP 38 may, in providing a service to the subscriber 70, after a step of 1) feature processing, send an unsolicited message, step 2) to the MP 36.

The MP 36 performs the screening steps 3), 4), and 5) as in FIG. 4 steps 12) 13) and 14). In addition, the MP 36 may perform dynamic arm/disarm screening and Radio Port Control Unit (RPCU) screening for personal communication services (PCS) step 6).

Based on service provider subscription, NCA (Non-Call Associated) messages from the SCP 38 intended for an RPCU (Radio Port Control Unit—for PCS) 72 must be authorized.

If an AIN message from the SCP 38 contains an RPCU Id of a destination RPCU 72, it is checked against an SCP-specific list of allowed RPCU Ids. If screening fails, the message is ignored, and the screening failure is pegged.

For unsolicited messages, the MP 36 may generate a billing record at step 7).

The service provider may be billed for every request to dynamically arm or disarm a previously provisioned trigger.

The remaining steps in FIG. 5 are the same as similarly worded steps in FIG. 4, performed by the same network element.

In step 11) the SSP 30 in processing the unsolicited message performs screening of trigger arm/disarm messages from the SCP 38. If an AIN message from the SCP 38 is a trigger arm or disarm request, the target user and trigger are checked to see that it exists and that the SCP associated with the user's trigger equals that of the SCP making the request. If screening fails, the request is rejected and the SCP 38 is informed.

The SSP 30 also checks automatic call gapping (ACG) messages from the SCP 38. If an ACG request is received from the SCP 38, the SSP 30 checks each query for the associated SCP before applying ACG controls. The SSP 30 must store the SCP identification, with each ACG request, to support this function.

At step 12), the SSP 30 generates a billing record for ACG requests. ACG requests from SCP 38 are billed according to the scope of each request's network impact. This includes the number of SSPs and users impacted, and the duration for the gapping process.

When the intelligent peripheral (IP) 34 is invoked in providing service, for example for announcements, a billing record is generated by the IP 34. Every time a custom announcement is to be played, a record may be made for usage-sensitive billing purposes. A "Send-To-Resource" response from the SCP 38 which corresponds to a custom announcement at the IP 34, initiates the billing action.

Figure 6:
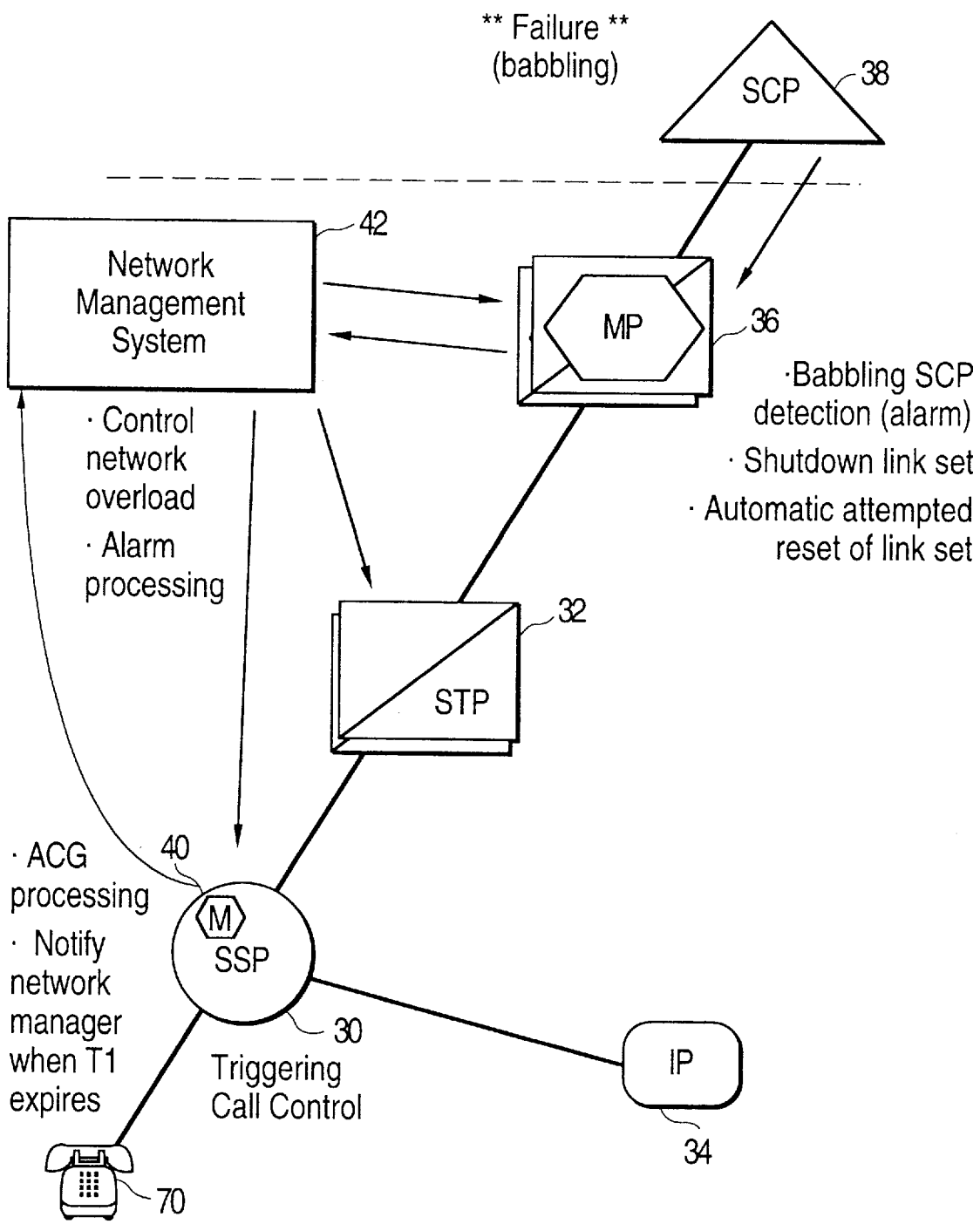
FIG. 6 illustrates in a block diagram message flow for overload management between mediation functions in the system of FIG. 2.

Referring to FIG. 6, there is illustrated in a block diagram, a message flow for overload management between mediation functions in the system of FIG. 2. FIG. 6 illustrates, by way of example, how overload management may be handled.

When the SS7 network becomes overloaded, remedial action is taken by the network by reducing traffic. The network reduces traffic in the following order (increasing severity) until the overload is remedied. As network surplus capacity returns, the remedial actions are stopped, in reverse order.

1) Mass Calling
2) overloaded SCPs
3) SCPs exceeding traffic thresholds
4) Uniformly, for all traffic on overloaded network resources.

FIG. 6 also shows examples of how the network elements deal with error conditions. For example, the MP 36 detects and controls babbling SCPs. A babbling SCP is one sending nonsense messages into the network which may cause network problems and hence must be detected and rectified quickly. The network monitors compliance with predetermined, expected service provider SCP TRAP traffic levels and takes remedial action if levels are exceeded.

The SSP 30 is also involved in error detection and recovery. For example, if the T1 timer expires, default action can be an announcement or continue routing on the dialed number or a default number.

When a query is sent to the SCP 38, the T1 timer is started (see FIG. 4, step 3). If the timer expires, or the SCP response is ignored due to screening, the default announcement or routing is taken, based on the trigger instance data. Network management is notified of T1 expiry.

The SSP 30 may, for example, take default action with regard to an existing ACG request. An existing ACG request from the SCP 38 causes the SSP 30 to abort the trigger query; subsequent handling is the same as it the query had been sent and the T1 timer expired. Default action is identical to that for T1 expiry, except network management is not notified.

Figure 7:
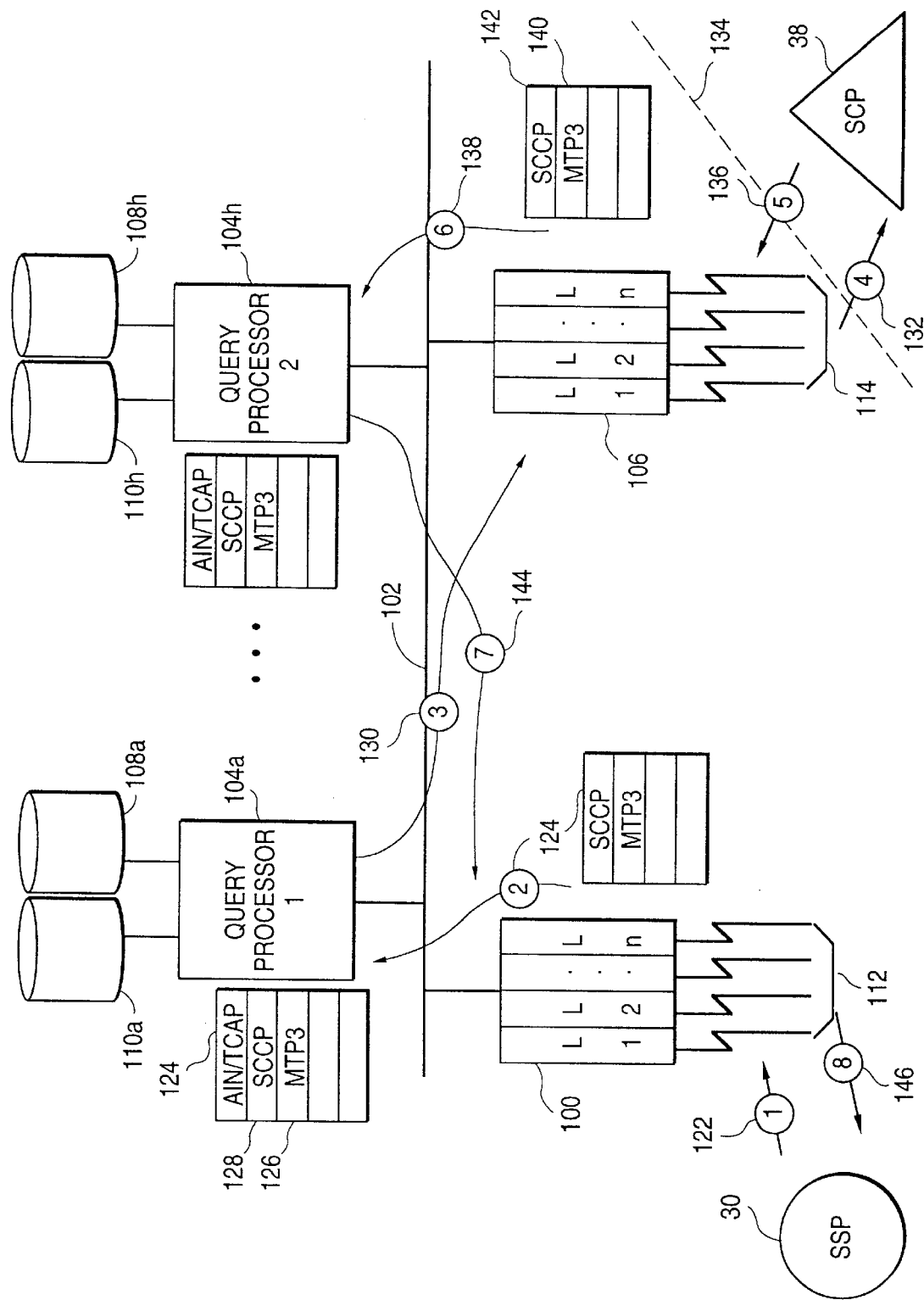
FIG. 7 illustrates in a block diagram the mediation point of FIG. 2 in accordance with an embodiment of the present invention.

Referring to FIG. 7, there is illustrated in a block diagram the mediation point 36 of FIG. 2 in accordance with an embodiment of the present invention. The mediation point (MP) 36 includes a network interface 100, a high-speed bus or local area network (LAN) 102 and multiple query processors 104 and a service provider (SP) interface 106. Each query processor (QP) 104 includes storage media 108 and 110 for retaining data related to service provisioning. The network interface 100, the query processors 104 and the service provider (SP) interface 106 are interconnected via the high-speed bus or LAN 102. The network interface 100 is connected to service switching points in the network via SS7 network links 112. The service provider interface 106 is connected to service provider via links 114.

The MP 36 is an example of a loosely-coupled architecture in which each processor is a self-contained computer system having local memory, disk drives and other I/O devices. The query processors 104 communicate with one another by sending messages across the high-speed bus or LAN 102.

An SSP 30 generates a normal AIN trigger query message, which is routed to the MP (message 1) 122. Using normal SS7 processing in the network interface 100, the MTP layer hands message off to the SCCP layer for further translation, which determines that the message requires application layer work at the MP. This is communicated (message 2) 124 to the appropriate query processor 104a and the mediation application is identified by the SCCP sub-system number (SSN).

The QP 104 has access to the full SS7 message 124, including the MTP 126 and SCCP 128 layers. The QP 104 performs the applicable screening and billing functions, referring to service provider profile and other supporting data in its associated data bases 108 and 110. The QP 104 sends the resulting message for SS7 routing (message 3) 130 to the service provider interface 106. At the service provider interface 106, normal SS7 processing determines (from the SCCP information) that the message is destined for the SCP 38, and transmits it (message 4) 132 across the network boundary 134 toward the service provider SCP 38.

The service provider SCP 38 processes the AIN message based on each user's subscription information and service logic, as arranged with their users. Once feature processing is completed, the results must be indicated to the SSP 30. The SCP 38 sends a response (message 5) 136 across the network boundary 134 to the MP. At the service provider interface 106, SS7 processing occurs as described above for the network interface 100. This results in sending of the message (message 6) 138 to a QP 104. The selected QP 104$h$ has access to the full SS7 message 138, including the MTP 140 and SCCP 142 layers. The QP 104$h$ performs the applicable screening, billing and error handling functions, referring to the service provider profile and other supporting data in its associated databases 108$h$ and 110$h$. If the message is not rejected, the QP 104$h$ sends the resulting message (message 7) 144 for SS7 routing to the network interface 100. At the network interface 100, normal SS7 processing determines (from the SCCP information) that the message is destined for the SSP 30, and transmits it (message 8) 146.

From this point, after subsequent normal SSP AIN message processing, further communication between the SSP 30 and SCP 38 may occur, and the operation of all elements shown is the same as described above. This is also true for SCP-initiated transactions and unidirectional messages.

QPs 104 can be added as load dictates, for the most economical deployment.

For each message, whether from the SSP 30 or SCP 38, any QP 104 can be selected. It need not be the same one as used for any other message, including other messages which are part of the same AIN transaction. Each QP 104 has access to the same databases of information, either by using the same instances of databases 108 and 110, or by duplicating the databases for each QP 104.

Once the MP has sent the message to the SCP 38 or SSP 30, no data regarding the transaction needs to be retained, and dynamic resources can be reused for processing of other messages. In this way, the MP supports full routing diversity for all AIN messages, that is, like an STP, any MP could handle any message. This allows maximum flexibility in network topology. An MP failure during a transaction will not cause a transaction failure if no messages are lost.

The mediation functions of the present invention are directed toward the AIN 0.1 and 0.2 releases of AIN as defined by Bellcore. The present invention provides a foundation for not only mediating access to 0.1 and 0.2 AIN capabilities, but also to those which are certain to arise in future releases, as long as the clear separation between SSP (basic call model) and SCP (service logic) is maintained. If the signalling between the SSP and the service logic element (which may not always be a pure SCP element) is something other than SS7 (e.g. X.25, Ethernet) the present invention still provides the types of functions located at the SSP and MP, and how the service logic element connects to the network.

The mediation point allows the intelligent network provider to customize routing, screening, error handling, and billing functions to suit the operating requirements of the network.

Numerous modifications, variations and adaptations may be made to the particular embodiments of the invention described above without departing from the scope of the invention, which is defined in the claims.

What is claimed is:

1. A system for interconnecting service providers to an intelligent network comprising:
   at least one service provider having a service control point, said at least one service provider located outside of the intelligent network;
   at least one service switching point located inside the intelligent network, said at least one service switching point being programmed to perform a first set of mediation functions, including screening, billing, error handling, and routing; and
   a mediation point located at the boundary of said intelligent network and interconnecting said at least one service provider and said at least one service switching point, said mediation point being programmed to perform a second set of mediation functions, including screening, billing, error handling, and routing;
   wherein messages transmitted from said service control point to said at least one service switching point and messages transmitted from said at least one service switching point to said service control point all contain an address to, and pass through, said mediation point.

2. The system as claimed in claim 1 and further comprising:
   a signal transfer point interconnected to said mediation point and said at least one service switching point; and
   an intelligent peripheral interconnected to said service switching point.

3. The system as claimed in claim 1 wherein said screening functions of said second set of mediation functions includes message transfer part screening, service switching point screening, parameter screening to and from said signal control point, radio port control unit identification screening, and recording received message errors.

4. The system as claimed in claim 1 wherein said billing functions of said second set of mediation functions includes trigger query billing.

5. The system as claimed in claim 1 wherein said error handling functions of said second set of mediation functions includes babbling service control point detection/control.

6. The system as claimed in claim 1 wherein said routing functions of said second set of mediation functions includes mediation point signal connection and control part procedures and routing messages.

7. The system as claimed in claim 1 wherein said screening functions of said first set of mediation functions includes enabling automatic call gapping to allowed users.

8. The system as claimed in claim 1 wherein said billing functions of said first set of mediation functions includes automatic call gapping usage billing.

9. The system as claimed in claim 1 wherein said error handling functions of said first set of mediation functions includes setting a custom timer value, selecting default routing upon expiration of the custom timer value, and selecting default routing upon detection of an automatic call gapping request.

10. The system as claimed in claim 1 wherein said routing functions of said first set of mediation functions includes service provider selection per trigger, signal connection and control point procedures at said service switching point, routing messages to said mediation point, and emergency service routing.

11. The system as claimed in claim 1 wherein said mediation point comprises a network interface, a plurality of query processors, and a service provider interface all interconnected by a bus, said network interface being connected to said at least one service switching point and said service provider interface being connected to said at least one service provider.

12. A method of providing service providers with mediated access to an intelligent network comprising:
   providing at least one service provider with a service control point, at least one service switching point in an intelligent network, and a mediation point interconnecting the service control point with the at least one service switching point;
   selecting a service provider at the service switching point;
   performing signal connection and control point procedures at the service switching point;
   setting a timer at the service switching point;
   routing a query to the mediation point at the service switching point;
   performing parameter screening at the mediation point;
   initiating trigger query billing at the mediation point;
   performing signal connection and control point procedures at the mediation point;
   routing the query to the service control point;
   processing the query at the service control point;
   generating a return message to the service switching point at the service control point;
   screening the return message at the mediation point;
   performing signal connection and control point procedures at the mediation point;
   routing the return message to the service switching point; and
   processing the return message at the service switching point.

13. The method as claimed in claim 12, wherein the step of screening the return message at the mediation point includes at least one of message transfer part screening, signal connection and control point screening, service switching screening, and parameter screening.

14. A method of providing mediated access to an intelligent network for transmission of an unsolicited message from a service provider to the intelligent network comprising:

providing at least one service provider with a service control point, at least one service switching point in an intelligent network, and a mediation point interconnecting the service control point with the at least one service switching point;

transmitting the unsolicited message to the mediation point from the service control point;

screening the unsolicited message at the mediation point;

performing signal connection and control point procedures at the mediation point;

routing the unsolicited message to the service switching point; and processing the unsolicited message at the service switching point.

15. The method claimed in claim 14 further comprising:

screening the unsolicited message at the service switching point to determine if the unsolicited message comprises a trigger arm/disarm message.

16. The method claimed in claim 15 further comprising:

screening the unsolicited message at the service switching point to determine if the unsolicited message comprises an automatic call gapping message; and generating a billing record at the service switching point for the automatic call gapping message.

17. The method claimed in claim 14 further comprising:

generating a billing record at the mediation point for the unsolicited message.

18. The method claimed in claim 14 wherein the step of screening the unsolicited message at the mediation point includes at least one of message transfer part screening, signal connection and control point screening, service switching screening, and radio port control unit screening.

19. The method claimed in claim 14 and further comprising:

detecting a babbling service control point at the mediation point.

20. A system for transmitting messages between a plurality of service providers and an intelligent network comprising:

a plurality of service control points located outside said intelligent network, each of said plurality of service control points associated with a particular one of said plurality of service providers;

a service switching point located within said intelligent network; and a mediation point at the boundary of said intelligent network programmed to screen and route queries transmitted from said service switching point to a selected one of said plurality of service control points and programmed to screen and route messages transmitted from said plurality of service control points to said service switching point, said service switching point addressing both said selected one of said plurality of service control points and said mediation point when transmitting a query to said selected one of said plurality of service control points, said service control points each addressing both said mediation point and said service switching point when transmitting a message to said service switching point.

* * * * *